(12) United States Patent
Makino et al.

(10) Patent No.: US 7,710,097 B2
(45) Date of Patent: May 4, 2010

(54) POWER SUPPLY WITH REDUCED POWER LOSSES DURING STANDBY MODE

(75) Inventors: Jun Makino, Singapore (SG); Boon Ghee Ting, Singapore (SG)

(73) Assignee: Creative Technology Ltd, Singapore (SG)

( * ) Notice: Subject to any disclaimer, the term of this patent is extended or adjusted under 35 U.S.C. 154(b) by 56 days.

(21) Appl. No.: 12/096,599

(22) PCT Filed: Dec. 6, 2006

(86) PCT No.: PCT/SG2006/000381

§ 371 (c)(1),
(2), (4) Date: Jun. 6, 2008

(87) PCT Pub. No.: WO2007/078259

PCT Pub. Date: Jul. 12, 2007

(65) Prior Publication Data

US 2008/0258703 A1    Oct. 23, 2008

(30) Foreign Application Priority Data

Dec. 30, 2005  (SG) .................. 200508579

(51) Int. Cl.
*H01F 29/02* (2006.01)
*G05F 1/14* (2006.01)
*G01D 5/22* (2006.01)

(52) U.S. Cl. .......... 323/346; 323/255; 323/347
(58) Field of Classification Search .......... 323/240, 323/247, 251, 255, 256, 332, 334, 340, 341, 323/345, 346, 347

See application file for complete search history.

(56) References Cited

U.S. PATENT DOCUMENTS

| 4,620,078 A | 10/1986 | Smith |
| 4,716,357 A | 12/1987 | Cooper |
| 4,937,731 A * | 6/1990 | Konopka .......... 363/143 |
| 5,001,623 A * | 3/1991 | Magid .......... 363/143 |

FOREIGN PATENT DOCUMENTS

| EP | 1087494 A2 | 3/2001 |
| FR | 2775394 | 8/1999 |

* cited by examiner

*Primary Examiner*—Jessica Han
*Assistant Examiner*—Emily Pham (57) ABSTRACT

There is provided a power supply for an electrical device operable in active mode and in standby mode. The power supply comprises a transformer having a primary winding on the primary side and a secondary winding on the secondary side. The primary winding is connectable to an AC voltage supply and is arranged to comprise N turns when the electrical device is in active mode and more than N turns when the electrical device is in standby mode. Circuitry on the secondary side is arranged to provide an output voltage for the electrical device during active mode.

15 Claims, 6 Drawing Sheets

POWER SUPPLY WITH REDUCED POWER LOSSES DURING STANDBY MODE

FIELD OF THE INVENTION

The invention relates to a power supply for an electrical device operable in active mode and in standby mode. In particular, the invention relates to a power supply for an electrical device, operable in active mode and in standby mode, which has very low power consumption during standby mode.

BACKGROUND OF THE INVENTION

Many electrical devices have two modes of operation: an active mode in which a load is connected to the output, and a standby mode in which no load (actually a very small load) is connected at the output. In active mode, the power supplied should be sufficient for the device to perform its usual functions and, in standby mode, minimal power should be expended: in most cases, just enough for the device to be switched back into active mode when necessary.

It is becoming increasingly important to conserve energy and reduce power losses and power supplies which have minimal power consumption during standby mode are becoming more and more desired. Such power supplies find applications in many situations, for example as standby power supplies in electrical devices (e.g. in televisions, washing machines) or within external power supplies for supplying power to detect whether an electrical device is connected or not and to switch on the main power supply (e.g. within a portable telephone charger where the telephone is placed in a cradle for charging).

Note that, throughout this specification, the terms "no-load mode" and "standby mode" are used interchangeably. Although, strictly speaking, the output load during standby is not zero, the load is extremely small and can be approximated to zero for all practical purposes.

Figure 1:
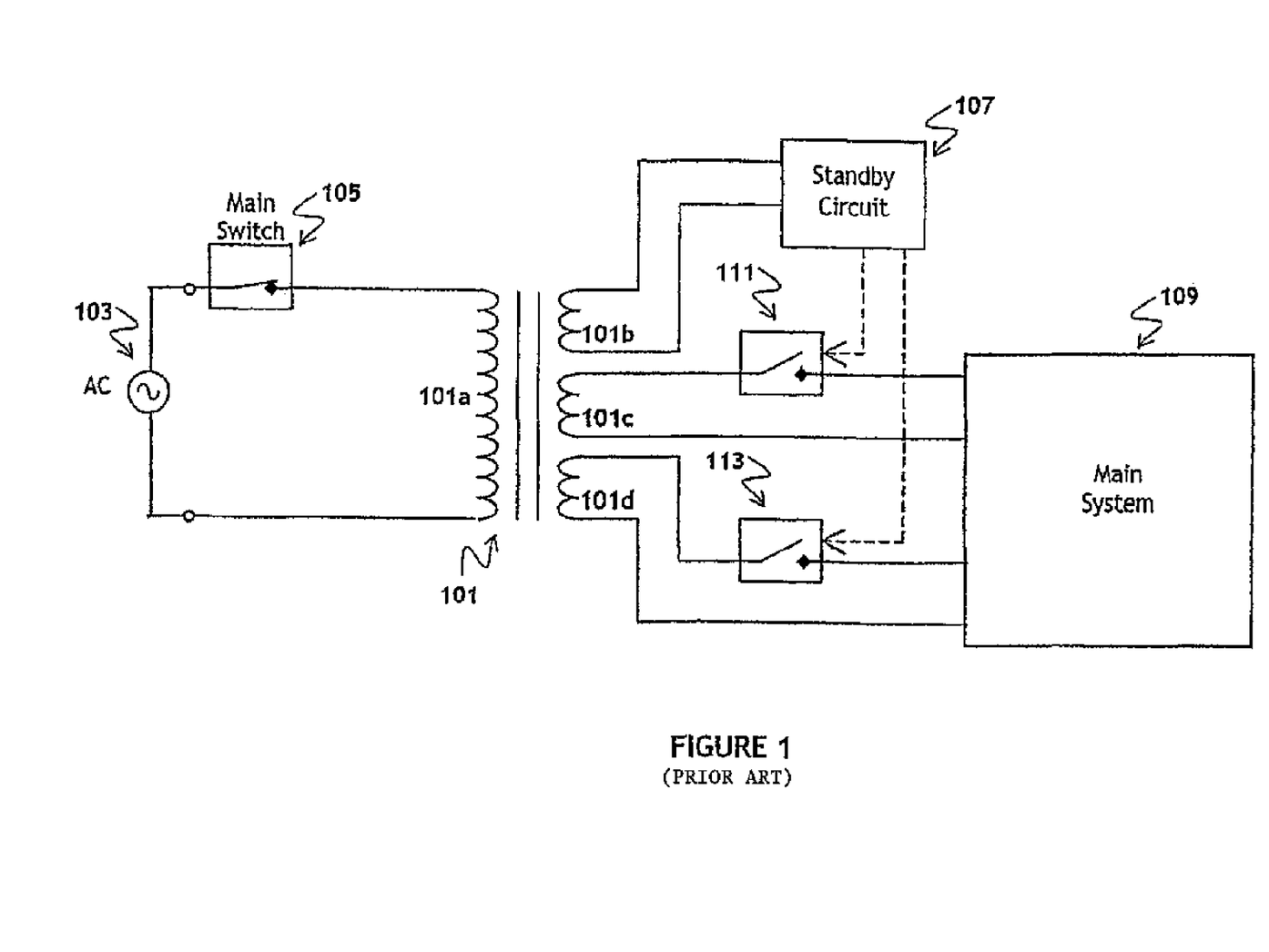
FIG. 1 shows a conventional power supply for a device operable in active and standby modes.

FIG. 1 shows one conventional arrangement of a transformer used in a power supply for a device which has a standby mode, for stepping down the voltage from the AC supply. The transformer 101 comprises a primary winding 101a and secondary windings 101b, 101c and 101d. The primary winding 101a is connected to an AC supply 103 via a switch 105. When switch 105 is closed, power is supplied to the transformer 101. Secondary winding 101b provides the supply voltage to standby circuit 107 and secondary windings 101c and 101d provide the supply voltage to the main device 109 (i.e. the output load) via switches 111 and 113 respectively. The main device 109 may be put into standby mode by opening switches 111 and 113 so that the supply voltage is no longer supplied to the main device 109. Those switches 111 and 113 may be operated by standby circuit 107 directly, by remote control or under some other form of control (e.g. automatic standby after a given period of time).

The design of a transformer such as transformer 101 in FIG. 1 is based on the power requirement of the device when in active mode. This may vary if the device is arranged to perform a number of different tasks each requiring a different power input. Once the maximum power requirement of the device during active mode has been determined, the transformer is then designed to deliver that maximum power (for at least some of the time) most economically (e.g. using the smallest possible amount of material) and with the smallest rise in temperature.

Referring once again to FIG. 1, when the device is put into standby mode by a user, standby circuit 107 cuts off the power supply to the main device 109 by opening switches 111 and 113. During standby mode, standby circuit only requires a small amount of power: in most cases, just enough to be able to switch the device back into active mode. Hence, during standby mode, the transformer 101 is actually much larger than required which means that its operation is rather inefficient. In that case, most of the power loss is due to the no-load losses from the primary winding of the transformer itself. These no-load losses consist mainly of core losses, which include hysteresis losses and eddy-current losses in the magnetic core, and copper losses due to the current flowing through the copper wire of the winding, which has a finite resistance. These three types of losses will be discussed further below.

Figure 2:
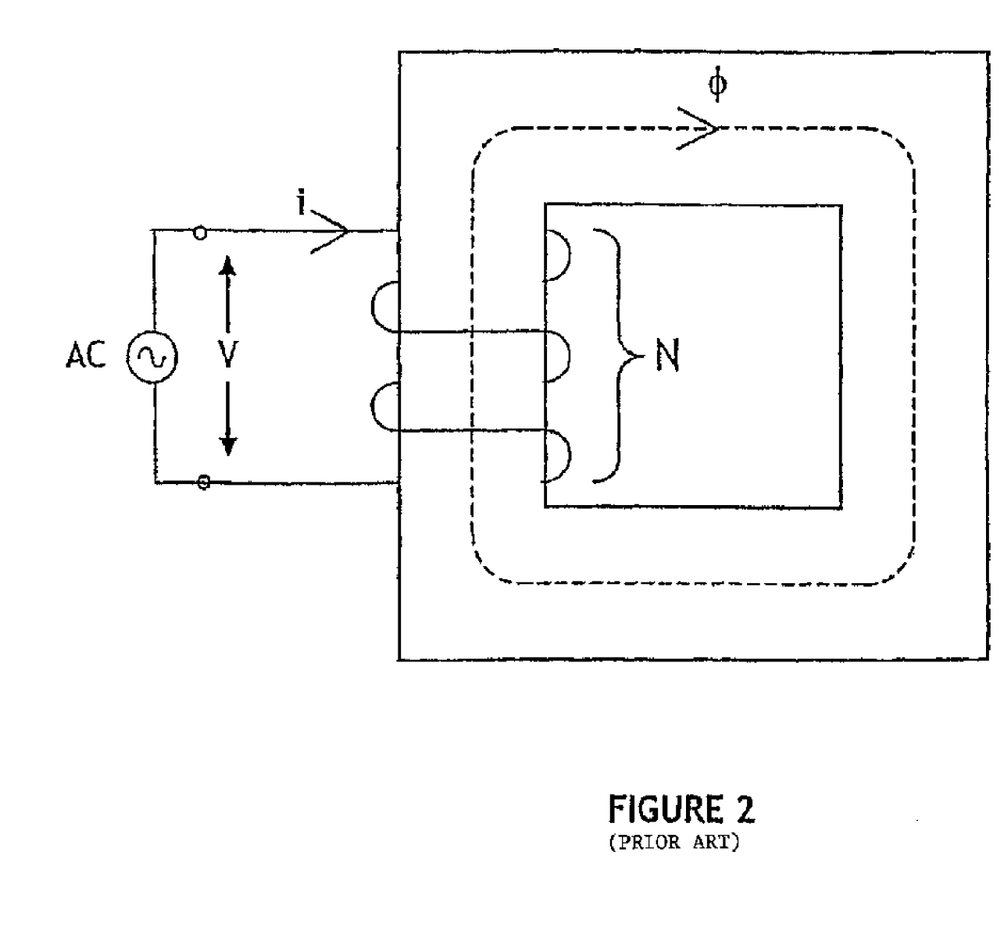
FIG. 2 shows a close approximation to a primary winding of a transformer during standby mode.

FIG. 2 shows an inductor coil having N turns, on a magnetic coil with an applied voltage. This is a close approximation to the primary winding of a transformer (such as transformer 101 in FIG. 1) when in no-load mode.

According to Faraday's law, the voltage is proportional to the rate of change of the magnetic flux:

$$v = N \frac{d\phi}{dt} \quad (1)$$

where v is the applied voltage, N is the number of turns in the primary winding and $\phi$ is the total magnetic flux through the winding.

If we assume a sinusoidal input voltage having frequency $\omega$ i.e. one of the form $v=\sqrt{2}V \cos \omega t$, substituting this into equation (1) gives us:

$$N \frac{d\phi}{dt} = \sqrt{2} V \cos \omega t \quad (2)$$

$$\phi = \frac{1}{N} \int \sqrt{2} V \cos \omega t = \frac{\sqrt{2} V}{N\omega} \sin \omega t$$

If we assume a uniform flux distribution, the magnetic flux density B is given by:

$$B = \frac{\phi}{A} \quad (3)$$

where A is the cross sectional area of the core.

Substituting equation (3) into equation (2) gives us:

$$AB = \frac{\sqrt{2} V}{N\omega} \sin \omega t$$

The maximum flux density $B_{max}$ is given when $\sin \omega t=1$. This gives:

$$B_{max} = \frac{\sqrt{2} V}{AN\omega} \quad (4)$$

The three types of losses, discussed above (hysteresis losses, eddy-current losses and copper losses) are given by equations (5), (6) and (7) below.

The hysteresis loss $P_h$ is given by:

$$P_h = K_h f (B_{max})^\alpha \quad (5)$$

where f is the excitation frequency, α is the Steinmetz exponent which will depend on the particular properties of the material used for the core (usually taken to be between 1.6 and 2.0) and $K_h$ is another constant also dependent on the particular properties of the core material.

The eddy current loss $P_e$ is given by:

$$P_e = K_e f^2 (B_{max})^2 \quad (6)$$

where f is the excitation frequency and $K_e$ is a constant dependent on the particular properties of the core material.

The copper loss $P_{Cu}$ is given by:

$$P_{Cu} = I_{RMS}^2 R \quad (7)$$

where $I_{RMS}$ is the root-mean-squared current through the winding and R is the effective impedance of the winding.

From equation (5), we see that, for the hysteresis loss:

$$P_h \propto (B_{max})^\alpha$$

and $$P_h \propto \frac{1}{N^\alpha}$$

From equation (6), we see that for the eddy-current loss:

$$P_e \propto (B_{max})^2$$

and $$P_e \propto \frac{1}{N^2}$$

That is, the core losses $P_h$ and $P_e$ increase as $B_{max}$ is increased but decrease as the number of turns N is increased.

The reader may assume from the above that the transformer should necessarily be designed with as many turns as possible in the windings in order to decrease $B_{max}$ as far as possible and hence reduce the core losses. However, this is not the case because the design of a transformer is based on the power requirement of the device when in active mode and the aim of the transformer is to deliver the required power most economically.

SUMMARY OF THE INVENTION

According to a first aspect of the invention there is provided a power supply for an electrical device operable in active mode and in standby mode, said power supply comprising: a transformer comprising a primary winding on the primary side and a secondary winding on the secondary side, wherein said primary winding is connectable to an AC voltage supply and is arranged to comprise N turns when said electrical device is in active mode and more than N turns when said electrical device is in standby mode, and wherein circuitry on said secondary side is arranged to provide an output voltage for said electrical device during active mode.

Because the number of turns on the primary side increases during standby mode, this decreases losses during standby mode.

In a first embodiment, the power supply further comprises a second primary winding on said primary side, said two primary windings being arranged to be connected in parallel when said electrical device is in active mode and in series when said electrical device is in standby mode.

When the two primary windings are connected in series, the total number of turns on the primary side is larger than when the two primary windings are connected in parallel. Thus, during active mode, the first primary winding comprises N turns but, during standby mode, when the second primary winding is connected in series with the first primary winding, the first primary winding effectively comprises more than N turns. Thus, the number of turns on the primary side is greater during standby mode than in active mode. This increase in the number of turns reduces power losses during standby mode. Of course, it is possible for there to be more than two windings (any number e.g. three, four, five and so on) on the secondary side, in which case, they should be connected in such a way that there are more total turns when the device is in standby mode than when the device is in active mode.

Preferably, said two primary windings are connectable to said AC voltage supply via a switch circuit, said switch circuit having a first configuration in which said two primary windings are connected in parallel and a second configuration in which said two primary windings are connected in series.

In the first embodiment, said secondary side may comprise a toggle circuit for switching the electrical device from active mode to standby mode and from standby mode to active mode. In that arrangement, said two primary windings may be connectable to the AC voltage supply via a switch circuit, said switch circuit having a first configuration in which said two primary windings are connected in parallel and a second configuration in which said two primary windings are connected in series, and said toggle circuit may be arranged to toggle said switch circuit from said first configuration to said second configuration when said electrical device switches from active mode to standby mode and to toggle said switch circuit from said second configuration to said first configuration when said electrical device switches from standby mode to active mode.

Thus, when a user switches the electrical device from active mode to standby mode, the toggle circuit switches the switch circuit from the first configuration (in which the two primary windings are connected in parallel) to the second configuration (in which the two primary windings are connected in series). When a user switches the electrical device from standby mode back to active mode, the toggle circuit switches the switch circuit from the second configuration to the first configuration.

The toggle circuit may be connected to the switch circuit. Alternatively the control of the switch circuit by the standby circuit may be by means of remote control.

In a second embodiment, the power supply further comprises a second primary winding on said primary side, only the first primary winding being connected when said electrical device is in active mode and the first and second primary windings being connected in series when said electrical device is in standby mode.

When the two primary windings are connected in series, the total number of turns on the primary side is larger than when only one of the two primary windings is connected. Thus, during active mode, the primary winding comprises N turns but, during standby mode, when the second primary winding is connected in series with the first primary winding, the primary winding effectively comprises more than N turns. This increase in the number of turns reduces power losses during standby mode. Of course, it is possible for there to be more than two windings on the secondary wide, in which case, they should be connected in such a way that there are more total turns when the device is in standby mode than when the device is in active mode.

Preferably, said two primary windings are connectable to said AC voltage supply via a switch circuit, said switch circuit having a first configuration in which only the first primary winding is connected and a second configuration in which the first and second primary windings are connected in series.

In the second embodiment, said secondary side may comprise a toggle circuit for switching the electrical device from active mode to standby mode and from standby mode to active mode. In that arrangement, said two primary windings may be connectable to the AC voltage supply via a switch circuit, said switch circuit having a first configuration in which only the first primary winding is connected and a second configuration in which the first and second primary windings are connected in series, and said toggle circuit may be arranged to toggle said switch circuit from said first configuration to said second configuration when said electrical device switches from active mode to standby mode and to toggle said switch circuit from said second configuration to said first configuration when said electrical device switches from standby mode to active mode.

In one embodiment, said secondary side includes a first secondary winding and a second secondary winding. In that embodiment, said first secondary winding may be connected to a toggle circuit, for toggling said electrical device from active mode to standby mode and from standby mode to active mode, and said second secondary winding may be arranged to provide said output voltage for said electrical device.

Said second secondary winding may be connected to said electrical device via a switch and said switch may be operable by said toggle circuit.

In one embodiment, the secondary side also includes a third winding, the first winding being connected to the toggle circuit and the second and third windings both being arranged to provide the output voltage for the electrical device.

In one embodiment, when a user switches the device from active mode to standby mode, the toggle circuit opens the switch between the second secondary winding and the electrical device and switches the switch circuit on the primary side from the first configuration (in which the two primary windings are connected in parallel or in which only one of the two primary windings is connected) to the second configuration (in which the two primary windings are connected in series). When a user switches the device back to active mode, the toggle circuit switches the switch circuit on the primary side from the second configuration (in which the two primary windings are connected in series) to the first configuration (in which the two primary windings are connected in parallel or in which only one of the primary windings is connected) and closes the switch between the second secondary winding and the electrical device.

According to a second aspect of the invention, there is provided a transformer for a power supply for an electrical device operable in active mode and in standby mode, said transformer comprising: a primary winding on the primary side, said primary winding being connectable to an AC voltage supply and being arranged to comprise N turns when said electrical device is in active mode and more than N turns when said electrical device is in standby mode; and a secondary winding on said secondary side.

Because the number of turns on the primary side increases during standby mode, this decreases losses during standby mode.

In a first embodiment, the transformer further comprises a second primary winding on said primary side, said two primary windings being arranged to be connected in parallel when said electrical device is in active mode and in series when said electrical device is in standby mode.

When the two primary windings are connected in series, the total number of turns on the primary side is larger than when the two primary windings are connected in parallel. Thus, during active mode, the first primary winding comprises N turns but, during standby mode, when the second primary winding is connected in series with the first primary winding, the first primary winding effectively comprises more than N turns. Thus, the number of turns on the primary side is greater during standby mode than in active mode. This increase in the number of turns reduces power losses during standby mode.

Preferably, said two primary windings are connectable to said AC voltage supply via a switch circuit, said switch circuit having a first configuration in which said two primary windings are connected in parallel and a second configuration in which said two primary windings are connected in series.

The transformer may further comprise a toggle circuit on said secondary side, for toggling said electrical device from active mode to standby mode and from standby mode to active mode.

In that case, said two primary windings are preferably connectable to said AC voltage supply via a switch circuit, said switch circuit having a first configuration in which said two primary windings are connected in parallel and a second configuration in which said two primary windings are connected in series, and said toggle circuit is preferably arranged to toggle said switch circuit from said first configuration to said second configuration when the electrical device switches from active mode to standby mode and to toggle the switch circuit from said second configuration to said first configuration when said electrical device switches from standby mode to active mode.

Thus, when a user switches the electrical device from active mode to standby mode, the toggle circuit switches the switch circuit from the first configuration (in which the two primary windings are connected in parallel) to the second configuration (in which the two primary windings are connected in series). When a user switches the electrical device from standby mode back to active mode, the standby circuit switches the switch circuit from the second configuration to the first configuration.

The standby circuit may be physically connected to the switch circuit. Alternatively the control of the switch circuit by the standby circuit may be by means of remote control.

In a second embodiment, the transformer further comprises a second primary winding on said primary side, only the first primary winding being connected when said electrical device is in active mode and the first and second primary windings being connected in series when said electrical device is in standby mode.

When the two primary windings are connected in series, the total number of turns on the primary side is larger than when only one of the two primary windings is connected. Thus, the number of turns on the primary side is greater during standby mode than in active mode. This increase in the number of turns reduces power losses during standby mode. Of course, it is possible for there to be more than two windings on the secondary wide, in which case, they should be connected in such a way that there are more total turns when the device is in standby mode than when the device is in active mode.

Preferably, said two primary windings are connectable to said AC voltage supply via a switch circuit, said switch circuit having a first configuration in which only the first primary winding is connected and a second configuration in which the first and second primary windings are connected in series.

In the second embodiment, said secondary side comprises a toggle circuit for switching the electrical device from active mode to standby mode and from standby mode to active mode. In that arrangement, said two primary windings may be connectable to the AC voltage supply via a switch circuit, said switch circuit having a first configuration in which only the first primary winding is connected and a second configuration in which the first and second primary windings are connected in series, and said toggle circuit may be arranged to toggle said switch circuit from said first configuration to said second configuration when said electrical device switches from active mode to standby mode and to toggle said switch circuit from said second configuration to said first configuration when said electrical device switches from standby mode to active mode.

According to a third aspect of the invention, there is provided a method for switching an electrical device from active mode to standby mode, the method comprising the steps of:
providing a power supply for the electrical device, the power supply comprising a transformer having two primary windings on the primary side and a secondary winding on the secondary side, each primary winding being connectable to an AC voltage supply via a switch circuit and the secondary winding providing an output voltage for the electrical device during active mode;
disconnecting the secondary winding from the electrical device; and
switching the switch circuit on the primary side from a first position in which the two primary windings are connected in parallel to a second position in which the two primary windings are connected in series.

According to the third aspect of the invention, there is provided a method for switching an electrical device from active mode to standby mode, the method comprising the steps of:
providing a power supply for the electrical device, the power supply comprising a transformer having two primary windings on the primary side and a secondary winding on the secondary side, each primary winding being connectable to an AC voltage supply via a switch circuit and the secondary winding providing an output voltage for the electrical device during active mode;
disconnecting the secondary winding from the electrical device; and
switching the switch circuit on the primary side from a first position in which only one of the two primary windings is connected to a second position in which the two primary windings are connected in series.

According to a fourth aspect of the invention, there is provided a method for switching an electrical device from standby mode to active mode, the method comprising the steps of:
providing a power supply for the electrical device, the power supply comprising a transformer having two primary windings on the primary side and a secondary winding on the secondary side, each primary winding being connectable to an AC voltage supply via a: switch circuit and the secondary winding providing an output voltage for the electrical device during active mode;
switching the switch circuit on the primary side from a second position in which the two primary windings are connected in series to a first position in which the two primary windings are connected in parallel; and
connecting the secondary winding to the electrical device.

According to a fourth aspect of the invention, there is provided a method for switching an electrical device from standby mode to active mode, the method comprising the steps of:
providing a power supply for the electrical device, the power supply comprising a transformer having two primary windings on the primary side and a secondary winding on the secondary side, each primary winding being connectable to an AC voltage supply via a switch circuit and the secondary winding providing an output voltage for the electrical device during active mode;
switching the switch circuit on the primary side from a second position in which the two primary windings are connected in series to a first position in which only one of the two primary windings is connected; and
connecting the secondary winding to the electrical device.

Features described in relation to one aspect of the invention may also be applicable to another aspect of the invention.

BRIEF DESCRIPTION OF THE DRAWINGS

A known arrangement has already been described with reference to FIGS. 1 and 2 of the accompanying drawings, of which.

The foregoing aspects and many of the attendant advantages of this invention will become more readily appreciated as the same become better understood by reference to the following detailed description, when taken in conjunction with FIGS. 3, 4a, 4b and 5 of the accompanying drawings, of which.

DETAILED DESCRIPTION OF PREFERRED EMBODIMENTS

Figure 3:
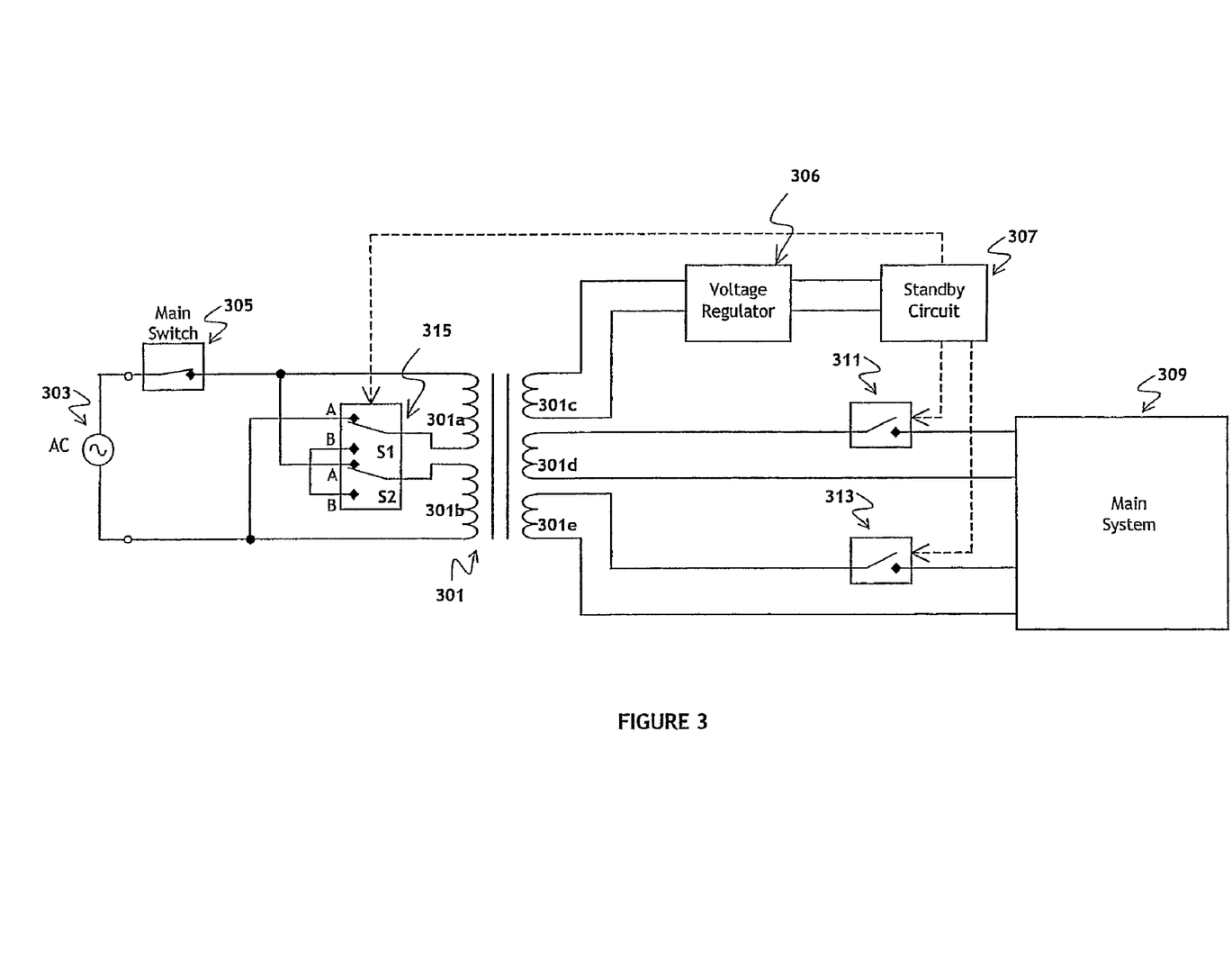
FIG. 3 shows a power supply for a device operable in active and standby modes according to a first embodiment of the invention.

FIG. 3 shows a transformer arrangement for a device according to a first embodiment of the invention. As in FIG. 1, transformer 301 comprises a primary side and a secondary side.

The secondary side of the transformer 301 is much the same as that of the conventional arrangement shown in FIG. 1. The transformer comprises secondary windings 301c, 301d and 301e. Secondary winding 301c provides the supply voltage to standby circuit 307, via voltage regulator 306, and secondary windings 301d and 301e provide the supply voltage to the main device 309 (i.e. the output load) via switches 311 and 313 respectively. The device may be put into standby mode by opening at least one of switches 311 and 313 so that the supply voltage is no longer supplied to or, in the case when only one switch is opened, adequate for the main device 309. It is most preferable that all switches connected to the main device 309 are open during standby mode so that the main device 309 does not draw any power, and so that the main device 309 is not damaged by a voltage drop in the secondary winding 301c. Those switches 311 and 313 may be operated by standby circuit 307 directly, by remote control or under some other form of control (e.g. automatic standby after a certain time period of inactivity).

Figure 4A:
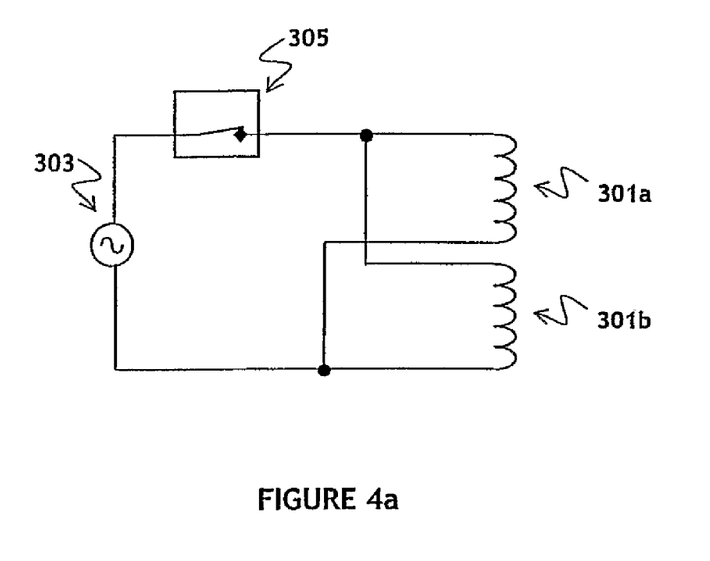
FIG. 4a shows an equivalent circuit to the primary side of FIG. 3 when switches S1 and S2 are at position A.
Figure 4B:
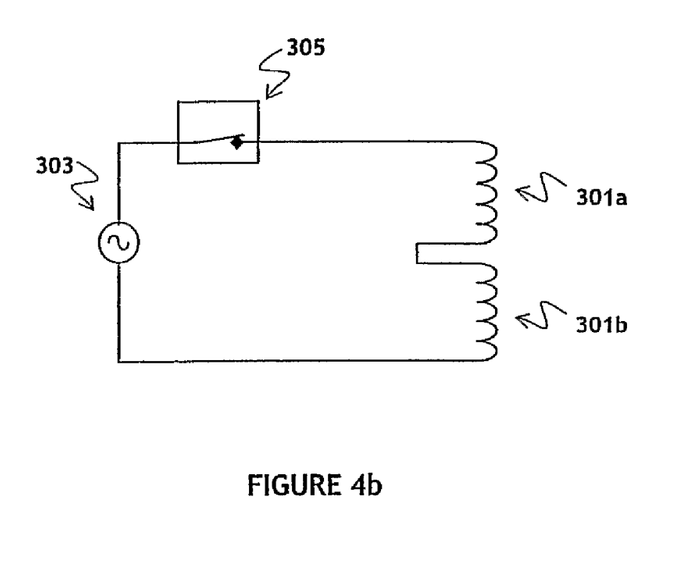
FIG. 4b shows an equivalent circuit to the primary side of FIG. 3 when switches S1 and S2 are at position B.

The primary side of transformer 301 is rather different from conventional arrangements, however. The transformer 301 comprises two primary windings 301a and 301b. Primary windings 301a and 301b are connected to AC supply 303 via switch 305, the nature of the connection depending on the position of switches S1 and S2 in switch circuit 315. Switch circuit 315 is controlled by standby circuit 307 on the secondary side. Standby circuit 307 acts as a toggle switch to activate active and standby modes. If switches S1 and S2 are both at position A, the arrangement is equivalent to the arrangement shown in FIG. 4a i.e. windings 301a and 301b are in parallel. On the other hand, if switches S1 and S2 are both at position B, the arrangement is equivalent to the arrangement shown in FIG. 4b i.e. windings 301a and 301b are in series.

Operation of the FIG. 3 arrangement will now be described. During active mode (i.e. normal operation), standby circuit 307 switches S1 and S2 to position A, configuring the windings 301a and 301b in parallel to provide power to the device 309. When the main device 309 is put into standby mode, switches 311 and 313 are opened and then switches S1 and S2 are switched to position B. Thus, the two primary windings 301a and 301b are now in series. This is equivalent to doubling the number of turns (N) in the primary winding. Referring to equation (4), since the AC frequency, the AC voltage and the core cross-section remain constant, this increase in N results in a decrease in the maximum flux density $B_{max}$.

Thus, during standby mode, we see a decrease in $B_{max}$. Referring to equation (5), which relates to hysteresis losses and equation (6), which relates to eddy-current losses, we see that, with this decrease in $B_{max}$, the core losses are decreased. Of course, with an increase in the number of turns N, we also see an increase in the impedance of the winding R. Referring to equation (7), which relates to copper losses, this might result in an increased copper loss. However, the increased impedance R also results in an associated decrease in current flowing through the winding. Referring to equation (7), we see that this results in a decrease in copper loss. Since the copper loss is proportional to R but proportional to the square of the current, the overall result is a decrease in copper loss.

Thus, with the arrangement of FIG. 3, the core losses and the copper losses in the primary winding during standby mode are all decreased.

When the device is "woken up" from standby mode and returned to active mode, switches S1 and S2 are switched to position A and then switches 311 and 313 are closed. This returns the windings 301a and 301b to their parallel configuration which supplies normal power to the device 309.

In the above description, when switching from active mode to standby mode, the switches 311 and 313 on the secondary side are opened first and afterwards the switches S1 and S2 on the primary side are switched to position B. Similarly, when switching from standby mode to active mode, the switches S1 and S2 on the primary side are first switched to position A and afterwards the switches 31 and 313 are closed. However, the timing of the switching is not critical. When switching from active mode to standby mode, as the number of turns in the primary winding increases (e.g. doubles), the voltages in the secondary windings decreases (e.g. halved). Since the voltages are decreased, so are lower than the voltages during normal operation in active mode, there is not normally any danger of overload to the main device 309 so it is not necessary to open the secondary side switches before switching the primary side switches. When switching from standby mode to active mode, the voltage regulator alleviates any voltage fluctuation problems by preventing any voltage surge from damaging components.

In the above embodiment, voltage regulator 306 is included before the standby circuit 307. Such a voltage regulator would usually be required to maintain a constant voltage supply to the standby circuit during both standby and normal operation irrespective of the actual voltage across the secondary windings, but, although preferred, is not always strictly necessary. The voltage regulator 306 may be removed from the standby circuit if the standby circuit is rated to handle a wide voltage band.

Figure 5:
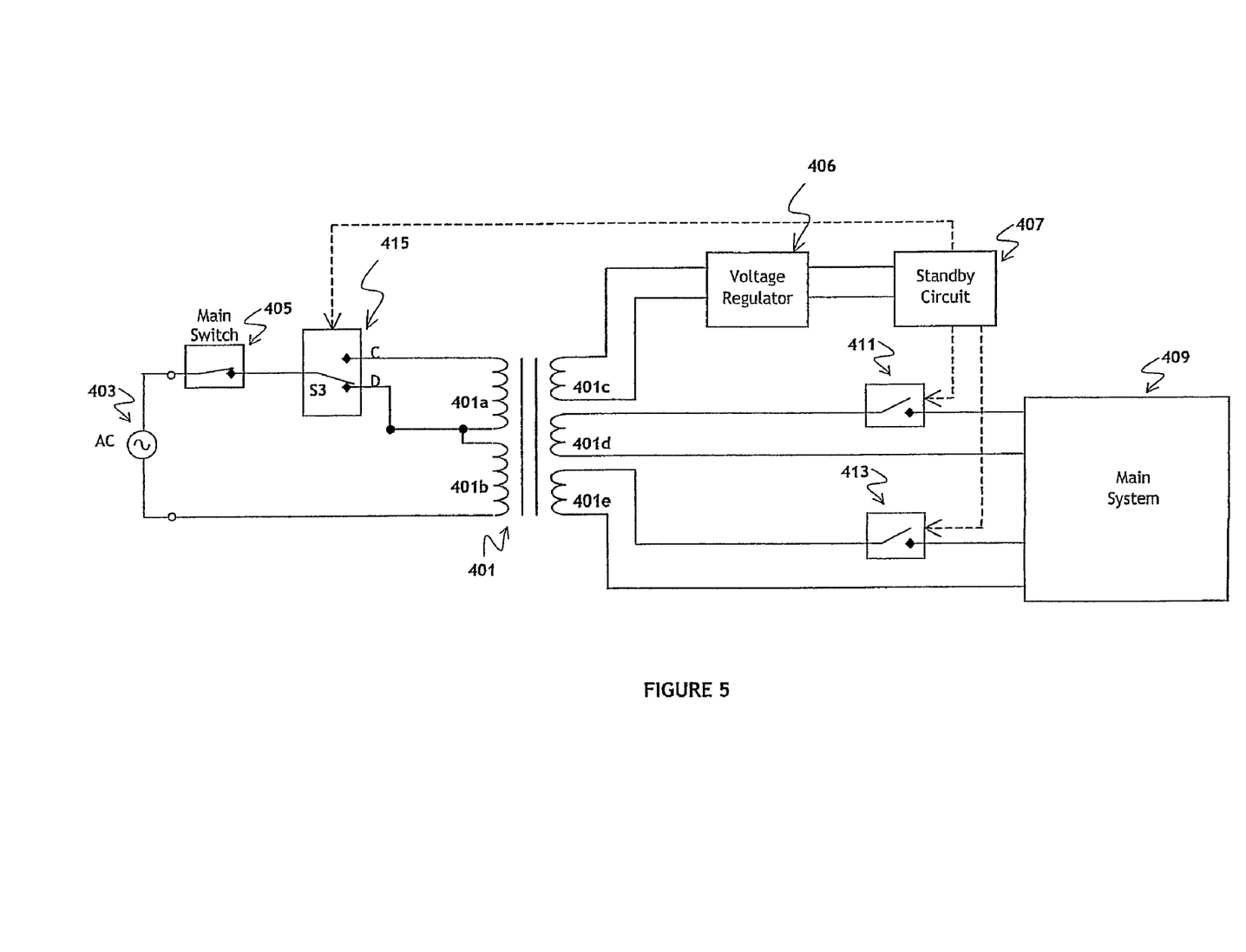
FIG. 5 shows a power supply for a device operable in active and standby modes according to a second embodiment of the invention.

FIG. 5 shows a transformer arrangement for a device according to an alternative embodiment of the invention. As in FIGS. 1 and 3, transformer 401 comprises a primary side and a secondary side. The secondary side of the transformer 401 is identical to the arrangement shown in FIG. 3. That is, the transformer 401 comprises secondary windings 401c, 401d and 401e. Secondary winding 401c provides the supply voltage to standby circuit 407 via voltage regulator 406 and secondary windings 401d and 401e provide the supply voltage to the main device 409 via switches 411 and 413 respectively.

However, the primary side of transformer 401 differs from the primary side of transformer 301 of FIG. 3. The transformer 401 comprises two primary windings 401a and 401b. Primary windings 401a and 401b are connected to AC supply 403 via switch 405, the nature of the connection depending on the position of switch S3 in switch circuit 415. Switch circuit 415 is controlled by standby circuit 407 on the secondary side. If switch S3 is at position D, current only flows in winding 401b. When switch S3 is at position C, current flows in both windings 401a and 401b in a series arrangement. Even with this difference in the primary side of transformer 401 compared to the primary side of transformer 301, the two circuits still function identically, where the core losses and the copper losses in the primary winding during standby mode are all decreased. There is one less switch prone to failure in this arrangement compared to that of the arrangement in FIG. 3.

It should be noted that, in the embodiment of FIG. 5, the wire used in winding 401b cannot be thinner because the thickness of the wire is derived from a current rating of the transformer 401. As such, winding 401a has to be added to winding 401b. Hence, the size of transformer 401 is increased.

In the FIG. 5 arrangement, only one of the primary windings is connected during active mode, whereas both primary windings are connected during standby mode. In FIG. 5, this is achieved by switching the switch S3 between positions C and D. Note, however, that the arrangement of FIG. 3 could be used to achieve the same result. For example, if switch S1 is at position A and switch S2 is at position B, winding 301a will be connected and winding 301b will not be connected. Similarly, if switch S1 is at position B and Switch S2 is at position A, winding 301b will be connected and winding 301a will not be connected.

Whilst there has been described in the foregoing description preferred embodiments of the present invention, it will be understood by those skilled in the technology concerned that many variations or modifications in details of design or construction may be made without departing from the present invention.

What is claimed is:

1. A power supply for an electrical device operable in active mode and in standby mode, said power supply comprising:
 a transformer comprising a primary winding on the primary side and a secondary winding on the secondary side, wherein circuitry on said secondary side is arranged to provide an output voltage for said electrical device during active mode,
 wherein said primary winding is connectable to an AC voltage supply and is arranged to comprise N turns when said electrical device is in active mode and more than N turns when said electrical device is in standby mode,
 the primary winding of said power supply comprising a first primary winding and a second primary winding, said first and second primary windings being arranged to be connected in parallel when said electrical device is in active mode and in series when said electrical device is in standby mode.

2. The power supply of claim 1, wherein said first and second primary windings are connectable to said AC voltage supply via a switch circuit, said switch circuit having a first configuration in which said first and second primary windings are connected in parallel and a second configuration in which said first and second primary windings are connected in series.

3. The power supply of claim 1, wherein said secondary side comprises a toggle circuit for toggling said electrical device from active mode to standby mode and from standby mode to active mode.

4. The power supply of claim 1, wherein said first and second primary windings are connectable to said AC voltage supply via a switch circuit, said switch circuit having a first configuration in which said first and second primary windings are connected in parallel and a second configuration in which said first and second primary windings are connected in series, and wherein a toggle circuit is arranged to toggle said switch circuit from said first configuration to said second configuration when said electrical device switches from active mode to standby mode and to toggle said switch circuit from said second configuration to said first configuration when said electrical device switches from standby mode to active mode.

5. A power supply for an electrical device operable in active mode and in standby mode, said power supply comprising:
a transformer comprising a primary winding on the primary side and a secondary winding on the secondary side, wherein circuitry on said secondary side is arranged to provide an output voltage for said electrical device during active mode,
wherein said primary winding is connectable to an AC voltage supply and is arranged to comprise N turns when said electrical device is in active mode and more than N turns when said electrical device is in standby mode,
the primary winding of said power supply comprising a first primary winding and a second primary winding, only the first primary winding being connected when said electrical device is in active mode and the first and second primary windings being connected in series when said electrical device is in standby mode, and wherein said secondary side comprises a toggle circuit for toggling said electrical device from active mode to standby mode and from standby mode to active mode.

6. The power supply of claim 5, wherein said first and second primary windings are connectable to said AC voltage supply via a switch circuit, said switch circuit having a first configuration in which only said first primary winding is connected and a second configuration in which said first and second primary windings are connected in series.

7. The power supply of claim 5, wherein said first and second primary windings are connectable to said AC voltage supply via a switch circuit, said switch circuit having a first configuration in which only said first primary winding is connected and a second configuration in which said first and second primary windings are connected in series, and wherein a toggle circuit is arranged to toggle said switch circuit from said first configuration to said second configuration when said electrical device switches from active mode to standby mode and to toggle said switch circuit from said second configuration to said first configuration when said electrical device switches from standby mode to active mode.

8. The power supply of claim 1, wherein said secondary side includes a first secondary winding and a second secondary winding.

9. The power supply of claim 8 wherein said first secondary winding is connected to a toggle circuit, for toggling said electrical device from active mode to standby mode and from standby mode to active mode, and said second secondary winding is arranged to provide said output voltage for said electrical device.

10. The power supply of claim 9 wherein said second secondary winding is connected to said electrical device via a switch and said switch is operable by said toggle circuit.

11. A transformer for a power supply for an electrical device operable in active mode and in standby mode, said transformer comprising:
a primary winding on the primary side, said primary winding being connectable to an AC voltage supply and being arranged to comprise N turns when said electrical device is in active mode and more than N turns when said electrical device is in standby mode; and
a secondary winding on said secondary side,
wherein the primary winding of said transformer comprises a first primary winding and a second primary winding, said first and second primary windings being arranged to be connected in parallel when said electrical device is in active mode and in series when said electrical device is in standby mode.

12. The transformer of claim 11, wherein said first and second primary windings are connectable to said AC voltage supply via a switch circuit, said switch circuit having a first configuration in which said first and second primary windings are connected in parallel and a second configuration in which said first and second primary windings are connected in series.

13. The transformer of claim 11, further comprising a toggle circuit on said secondary side, for toggling said electrical device from active mode to standby mode and from standby mode to active mode.

14. The transformer of claim 11, wherein said first and second primary windings are connectable to said AC voltage supply via a switch circuit, said switch circuit having a first configuration in which said first and second primary windings are connected in parallel and a second configuration in which said first and second primary windings are connected in series, and wherein a toggle circuit is arranged to toggle said switch circuit from said first configuration to said second configuration when said electrical device switches from active mode to standby mode and to toggle said switch circuit from said second configuration to said first configuration when said electrical device switches from standby mode to active mode.

15. A transformer for a power supply for an electrical device operable in active mode and in standby mode, said transformer comprising:
a primary winding on the primary side, said primary winding being connectable to an AC voltage supply and being arranged to comprise N turns when said electrical device is in active mode and more than N turns when said electrical device is in standby mode; and
a secondary winding on said secondary side,
wherein the primary winding of said transformer comprises a first primary winding and a second primary winding, only the first primary winding being connected when said electrical device is in active mode and the first and second primary windings being connected in series when said electrical device is in standby mode, and wherein said secondary side comprises a toggle circuit for toggling said electrical device from active mode to standby mode and from standby mode to active mode.

* * * * *